US012557904B2

(12) United States Patent
Davis

(10) Patent No.: US 12,557,904 B2
(45) Date of Patent: Feb. 24, 2026

(54) PAINT BRUSH CLEANING SYSTEM

(71) Applicant: Malcomb Davis, Signal Hill, CA (US)

(72) Inventor: Malcomb Davis, Signal Hill, CA (US)

( * ) Notice: Subject to any disclaimer, the term of this patent is extended or adjusted under 35 U.S.C. 154(b) by 0 days.

(21) Appl. No.: 18/189,425

(22) Filed: Mar. 24, 2023

(65) Prior Publication Data

US 2023/0225498 A1 Jul. 20, 2023

Related U.S. Application Data

(62) Division of application No. 17/212,418, filed on Mar. 25, 2021, now Pat. No. 11,684,149.

(51) Int. Cl.

| | |
|---|---|
| ***A46B 17/06*** | (2006.01) |
| ***A46B 13/00*** | (2006.01) |
| ***A46D 1/00*** | (2006.01) |
| ***B08B 1/12*** | (2024.01) |
| ***B08B 1/32*** | (2024.01) |
| ***B08B 1/34*** | (2024.01) |

(52) U.S. Cl.

CPC ............ *A46B 17/06* (2013.01); *A46B 13/001* (2013.01); *A46D 1/0207* (2013.01); *B08B 1/12* (2024.01); *B08B 1/34* (2024.01); *A46B 2200/202* (2013.01); *A46B 2200/3093* (2013.01); *B08B 2203/027* (2013.01)

(58) Field of Classification Search

None

See application file for complete search history.

(56) References Cited

U.S. PATENT DOCUMENTS

| | | | | | |
|---|---|---|---|---|---|
| 1,119,201 | A | * | 12/1914 | Szarka | A47L 23/263 15/36 |
| 1,323,409 | A | * | 12/1919 | Rude | A47L 23/263 15/36 |
| 1,335,388 | A | * | 3/1920 | Ragina | A47L 23/263 15/36 |
| 1,409,234 | A | * | 3/1922 | Di Piazza | A46B 17/06 15/3 |
| 1,497,716 | A | | 6/1924 | Fawcett | |
| 1,501,068 | A | | 7/1924 | Schatz | |
| 1,973,709 | A | | 9/1934 | Harold et al. | |
| 2,176,988 | A | | 10/1939 | Cameron | |
| 2,218,271 | A | | 10/1940 | Sodeberg | |
| 2,425,251 | A | | 8/1947 | Landau | |
| 2,594,176 | A | | 4/1952 | Kaiser | |

(Continued)

*Primary Examiner* — Tom Rodgers

(74) *Attorney, Agent, or Firm* — Perkins Coie LLP; Andrew Pettit; Ben Brokesh

(57) ABSTRACT

A paint brush cleaning system includes a housing and a paint brush cleaner attached to the housing. The housing contains solvent that helps clean a paint brush. The paint brush cleaner rotates a wire brush against the bristles of the paint brush and actuates a pump to eject solvent drawn from the housing as the paint brush is moved in translation. The wire brush is coupled to a retractable cord, which rotates the wire brush. A holder is simultaneously coupled to the retractable cord and the pump. When force is exerted on the holder, the retractable cord rotates the wire brush and the pump ejects solvent. A user can insert a paint brush handle through the holder, thus actuating the pump and rotating the wire brush by applying force to the handle. The housing attaches to a user's belt, providing easy access to the paint brush cleaning system.

8 Claims, 8 Drawing Sheets

(56) References Cited

U.S. PATENT DOCUMENTS

| | | | | |
|---|---|---|---|---|
| 2,922,248 | A | 1/1960 | Louis | |
| 3,160,319 | A | 12/1964 | Klaudius et al. | |
| 3,163,335 | A | 12/1964 | Chappell | |
| 3,348,253 | A * | 10/1967 | Mccoy | A45D 24/46 15/38 |
| 3,542,261 | A | 11/1970 | Greenberg | |
| 3,720,184 | A | 3/1973 | Pearce | |
| 4,118,821 | A | 10/1978 | Kuhn | |
| 4,134,365 | A | 1/1979 | Futers et al. | |
| 4,180,430 | A | 12/1979 | Gelman | |
| 4,331,232 | A | 5/1982 | Larkin | |
| 4,476,601 | A * | 10/1984 | Oka | B08B 1/32 15/77 |
| 4,573,434 | A | 3/1986 | Gardner | |
| 4,840,143 | A | 6/1989 | Simon | |
| 4,912,797 | A | 4/1990 | Brackett | |
| 4,993,546 | A | 2/1991 | Southard | |
| 5,165,365 | A | 11/1992 | Thompson | |
| 5,228,601 | A | 7/1993 | Podesta | |
| 5,259,336 | A | 11/1993 | Clark | |
| 5,377,621 | A | 1/1995 | Camm | |
| 5,590,817 | A | 1/1997 | Kaufman | |
| 5,680,929 | A | 10/1997 | Von | |
| 5,687,783 | A | 11/1997 | Finnegan | |
| 5,769,280 | A | 6/1998 | Ehresmann | |
| 5,775,550 | A | 7/1998 | Toll | |
| 5,884,817 | A | 3/1999 | Kaufman et al. | |
| 6,467,428 | B1 | 10/2002 | Andrisin et al. | |
| 6,971,331 | B1 | 12/2005 | Rohrer | |
| 7,472,807 | B1 | 1/2009 | Black | |
| 8,381,686 | B2 | 2/2013 | Spiegel | |
| 9,155,285 | B2 | 10/2015 | Li | |
| 9,220,391 | B1 | 12/2015 | Henninger | |
| D751,774 | S | 3/2016 | Allen et al. | |
| 9,907,291 | B2 | 3/2018 | Lathim | |
| D846,815 | S | 4/2019 | Darkwah | |
| 10,357,132 | B1 | 7/2019 | Martin | |
| 10,759,647 | B1 | 9/2020 | Fabozzi et al. | |
| 2004/0083646 | A1 | 5/2004 | Bielen | |
| 2005/0155983 | A1 | 7/2005 | Robinson et al. | |
| 2009/0194138 | A1 | 8/2009 | Burns | |
| 2009/0241257 | A1 * | 10/2009 | Malta | A47K 7/024 4/606 |
| 2010/0213215 | A1 | 8/2010 | Laible | |
| 2011/0283947 | A1 | 11/2011 | Linke | |
| 2011/0283948 | A1 | 11/2011 | Wong | |
| 2012/0125263 | A1 | 5/2012 | Northrop et al. | |
| 2013/0056496 | A1 | 3/2013 | Coleman | |
| 2015/0096597 | A1 * | 4/2015 | Patel | A47L 23/66 134/18 |
| 2015/0122185 | A1 | 5/2015 | Lucky | |
| 2017/0215375 | A1 | 8/2017 | Mckay | |
| 2018/0028040 | A1 * | 2/2018 | Delangue | A46B 17/06 |

* cited by examiner

PAINT BRUSH CLEANING SYSTEM

CROSS-REFERENCE TO RELATED APPLICATION

This application is a divisional of U.S. patent application Ser. No. 17/212,418, filed Mar. 25, 2021, which is incorporated by reference herein in its entirety.

TECHNICAL FIELD

The disclosed teachings relate to a paint brush cleaning system. More specifically, the disclosed teachings relate to a paint brush cleaning system with a rolling wire brush and housing.

BACKGROUND

A paint brush is commonly made by clamping bristles to a handle with a ferrule. A paint brush can be used for any of a variety of applications, such as painting a house to small decorative paintings. The handle, bristles, and ferrule of the paint brush can be designed to best suit the intended application. For example, bristle shapes can be angled, flat, tapered, or in striker shapes for decorative painting purposes. Alternatively, for large scale projects, bristles can be flat, mop-like, or rounded.

It is generally recommended to clean as much of the paint off of a paint brush as possible after each use (e.g., switching paint colors). Cleaning a paint brush can include submerging the bristles into water or solvents and/or rubbing the bristles against, for example, a towel. The goal of cleaning is to remove the paint from the bristles to avoid the paint drying onto the bristles and to avoid mixing of colors when the brush is used later. Existing methods of cleaning a paint brush can be difficult, time-consuming and messy, especially for oil-based paints, which cannot be cleaned just with water. Also, a user may need multiple pieces of equipment to clean a paint brush. For example, a professional painter may need solvents, buckets, towels, water, and cleaning brushes (e.g., nylon or metal based) to sufficiently clean multiple paint brushes that have been used to apply multiple types and colors of paint. Thus, it is cumbersome for a painter that travels from project to project to transport the equipment.

BRIEF DESCRIPTION OF THE DRAWINGS

Various features of the technology will become apparent to those skilled in the art from a study of the Detailed Description in conjunction with the drawings. Embodiments of the technology are illustrated by way of example and not limitations in the drawings, in which like references may indicated similar elements.

DETAILED DESCRIPTION

Figure 1:
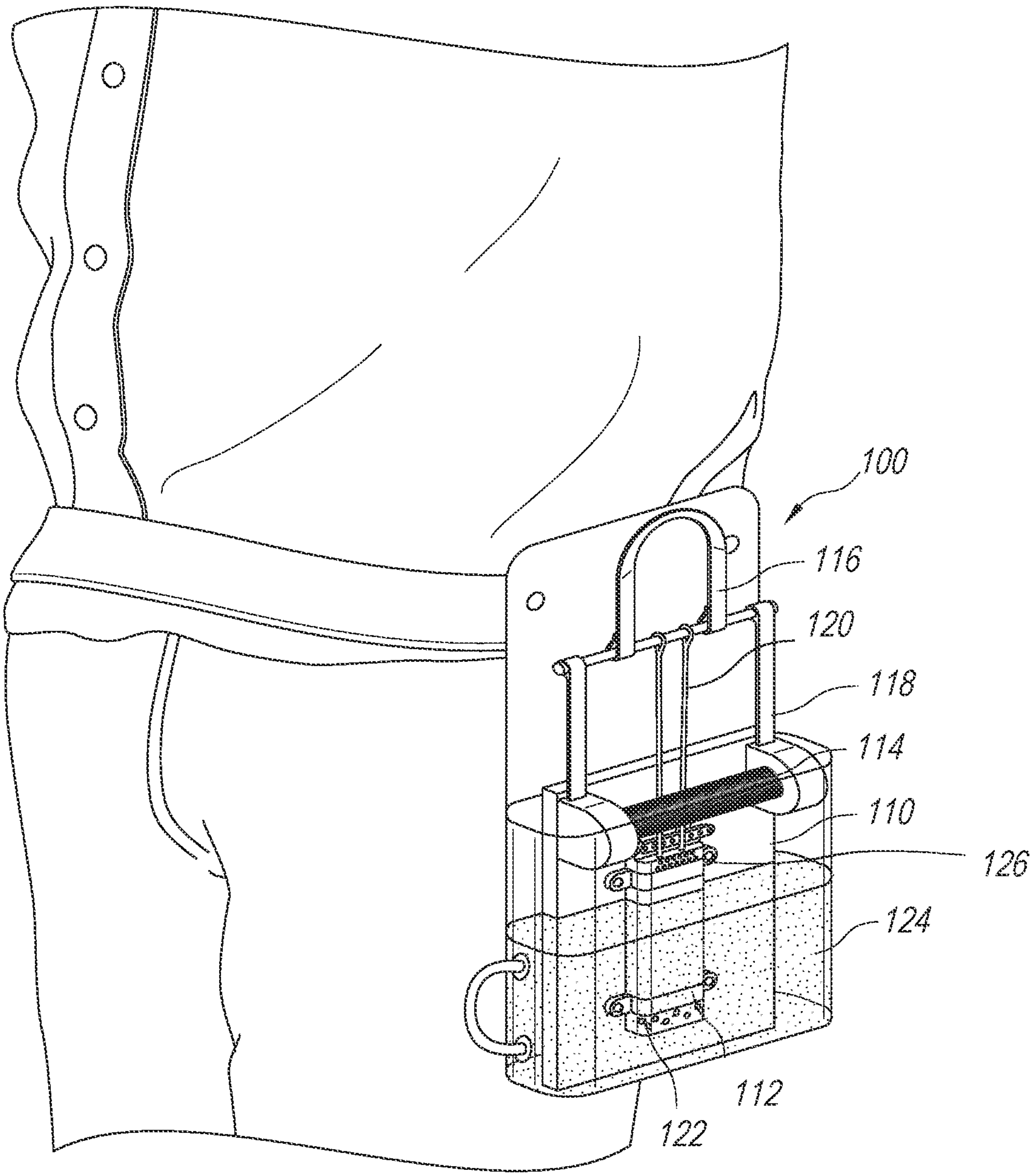
FIG. 1 depicts an embodiment of a paint brush cleaning system.

Cleaning a paint brush after each use can prolong the life of the paint brush. Dried-on paint may not quickly dissolve when water and/or solvent is applied, so it's important to clean the paint brush quickly after using it. In addition, it's important to thoroughly clean the paint brush to prevent mixing of paints if the paint brush is used for more than one paint. However, existing methods of cleaning a paint brush are time-consuming and messy, often requiring large amounts of solvents. Other existing methods may require cleaning the paint brush under running water, which may not be easily accessible, for example, when painting on a ladder or scaffolding. Consequently, many people do not clean their paint brushes after use, or they do a poor job of cleaning the paint brushes, both of which can reduce the useful life of a paint brush.

Currently, a user (e.g., a painter) can sometimes be forced to repeatedly apply water and/or solvent to the paint brush to remove the dried-on paint. This can require large amounts of solvents or multiple steps of applying solvent, water, and/or soap. Alternatively, the user can exert an external force such as rubbing the paint brush against a paper towel. In either case, the water and/or solvent alone is not sufficient. Further, the cleaning agents can be flammable, odorous, and release unhealthy gases. This issue becomes even more magnified for a non-professional painter. For example, parents of children need to be able to clean the paint brushes using child-friendly methods.

Introduced here, therefore, is a paint brush cleaning system that removes paint from a paint brush. In at least some embodiments, a paint brush cleaner including a rotating wire brush and pump is coupled to a housing, which holds a liquid cleaning agent at the bottom. The rotating wire brush and pump are coupled to a brush holder that receives the handle of the paint brush. When the user pulls on the brush holder via the paint brush handle, the wire brush rotates against the bristles of the paint brush while the pump draws liquid from the holder and ejects the liquid onto the paint brush. Thus, the user can simultaneously apply solvent while removing paint from the paint brush with the mechanical action of the wire brush. The holder can attach to a user, such as by clipping to a user's belt, so the paint brush cleaning system can be carried along with the user and used in a variety of situations.

Terminology

References herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Paint Brush Cleaning System

FIG. 1 depicts an embodiment of a paint brush cleaning system 100. The paint brush cleaning system 100 includes a paint brush cleaner 110 and a housing 124. The paint brush cleaner 110 includes a pump 112, wire brush 114, holder 116, retractable cords 118, and cables 120. The housing 124 can be a pouch or other receptacle. For example, the housing 124 can be a reservoir, which contains liquid, such as water, paint thinner, mineral spirits, denatured alcohol, linseed oil, turpentine, acetone, or other suitable cleaning agents. The paint brush cleaner 110 can be attached to an interior surface of the housing 124 by an attachment mechanism, such as hooks, loops, adhesive, etc. For example, the attachment mechanism can be on a bottom surface of a base of the paint brush cleaner 110 while the other components of the paint brush cleaner 110 are on a top surface of the base. In some embodiments, the paint brush cleaner 110 can operate separately from the paint brush cleaning system 100. For example, the paint brush cleaner 110 can be used without being attached to the housing 124 and instead be coupled to a sink or a table (e.g., via hooks).

The paint brush cleaning system 100 can be attached to the user, such as on to a belt worn by the user. The paint brush cleaning system 100 can be attached to a user's belt such that the user can access the paint brush cleaning system while working in a variety of situations, such as on a ladder, rooftop, or mechanical lift. The paint brush cleaning system 100 can be attached to a belt or other clothing by clips, hooks, rings, snaps, hook and loop fasteners, or other attachment mechanisms. The housing 124 can be attached directly to the belt or other clothing, or the housing 124 can be attached indirectly to the clothing. In some embodiments, the paint brush cleaning system 100 includes a belt or strap, such as shoulder strap, so the user can carry the paint brush cleaning system 100 by putting the strap around the user's shoulders, for example. In some embodiments, the paint brush cleaning system 100 can be attached to a ladder, a wall, a bucket, or other suitable locations by similar attachment mechanisms. For instance, a hooking mechanism can be attached to the housing 124, which can hook onto a bucket.

The paint brush cleaner 110 can include a pump 112, which can draw liquid from the bottom of the housing 124, for example through inlet valves 122. The liquid can be paint thinner, water, mineral spirits, or another solvent. The pump can be attached to a top surface of a base. For example, the pump can be attached to the top surface of the base by nails, screws, bolts, snaps, or adhesive. A user can activate the pump 112 by exerting a force on the holder 116. The pump 112 can include a piston that can draw liquid from the housing 124 and cause the pump 112 to eject the liquid through a nozzle toward the paint brush. In some embodiments, a user can dip a paint brush directly into solvent in the housing 124 to help clean the paint brush without activating the pump 112.

The pump 112 can include a chamber, a piston, and a nozzle 126. The chamber and piston will be shown in greater details in FIGS. 5A-C. The nozzle 126 can be, for example, multiple openings that allow the liquid from inside the pump 112 to be eject into housing 124. The pump can be configured to draw liquid from a reservoir into the chamber. When the piston is moved, pressure is built within the chamber, causing the liquid to be ejected through the nozzle 126. The nozzle 126 can be configured to spray the liquid at a desired pressure. The piston can be coupled to a holder 116, which the user can use to position the paint brush. For example, the piston can be pulled by a cable 120 coupled to the holder 116. The user can then pull the paint brush against the holder 116 to cause the piston to move, thereby activating the pump 112 to spray the liquid through the nozzle 126. The liquid can be any suitable solvent to help clean the paint brush, such as water, paint thinner, or mineral spirits.

The paint brush cleaner 110, in some embodiments, includes a wire brush 114 coupled to spindles positioned on either side of the wire brush 114. The wire brush 114 can be cylindrical and rotate along a central axis. The spindles rotate to allow the cylindrical brush to also rotate. The spindles are coupled to retractable cords 118, which cause the spindle and cylindrical brush to rotate as the retractable cords 118 are extended from a housing. The spindles are further coupled to, for example, torsion springs, which can be configured to cause the cord to retract into the housing. The retractable cords 118 can be coupled to a holder 116, which the user can use to position the paint brush. Thus, the user can pull the paint brush against the holder 116 to extend the retractable cords 118 and rotate the wire brush as the bristles of the paint brush are drawn across it. The torsion springs cause the retractable cords 118 to retract, which enables the user to repeatedly pull the paint brush against the rotating wire brush with less effort.

In some embodiments, the paint brush cleaner 110 includes both a wire brush 114 and a pump 112, as described above. The wire brush 114 and the pump 112 can both be coupled to a holder 116, which the user can use to position the paint brush. For example, the wire brush 114 can be coupled to retractable cords 118, which cause the wire brush 114 to rotate as the retractable cords 118 are pulled. The pump 112 can be coupled to cables 120, which move a piston within the pump 112 as the cables 120 are pulled. The retractable cords 118, cables 120, and holder 116 can all be coupled to a single bar or rod, such that the user can pull the paint brush against the holder 116 to simultaneously cause the wire brush 114 to rotate and to spray liquid from the pump 112. Thus, the paint brush can be cleaned from the mechanical action of the rotating wire brush 114 as well as the liquid from the pump 112. In addition, the wire brush 114 can be coupled to torsion springs, which then pull the paint brush back to its initial position. The user can thus quickly and repeatedly rotate the wire brush 114 and activate the pump 112 to clean the paint brush.

The housing 124 is configured to be worn, for example, on the user's belt and to hold liquid at the bottom of the housing. The housing can further be configured to hold the components of the paint brush cleaner 110, including the wire brush 114 and the pump 112, with the holder 116 positioned near the top of the housing. The holder 116 can be configured to receive the handle of a paint brush, such that the user can pull the paint brush handled against holder 116 to rotate the wire brush 114 and activate the pump 112. This allows the user to clean the paint brush without needing to go to a sink or bucket. For example, the user could clean his or her paint brush while standing on a ladder. The housing 124 also minimizes splashing of harmful solvents such as paint thinner, as the liquid and the paint brush cleaner 110 are contained in the housing 124.

Figure 2:
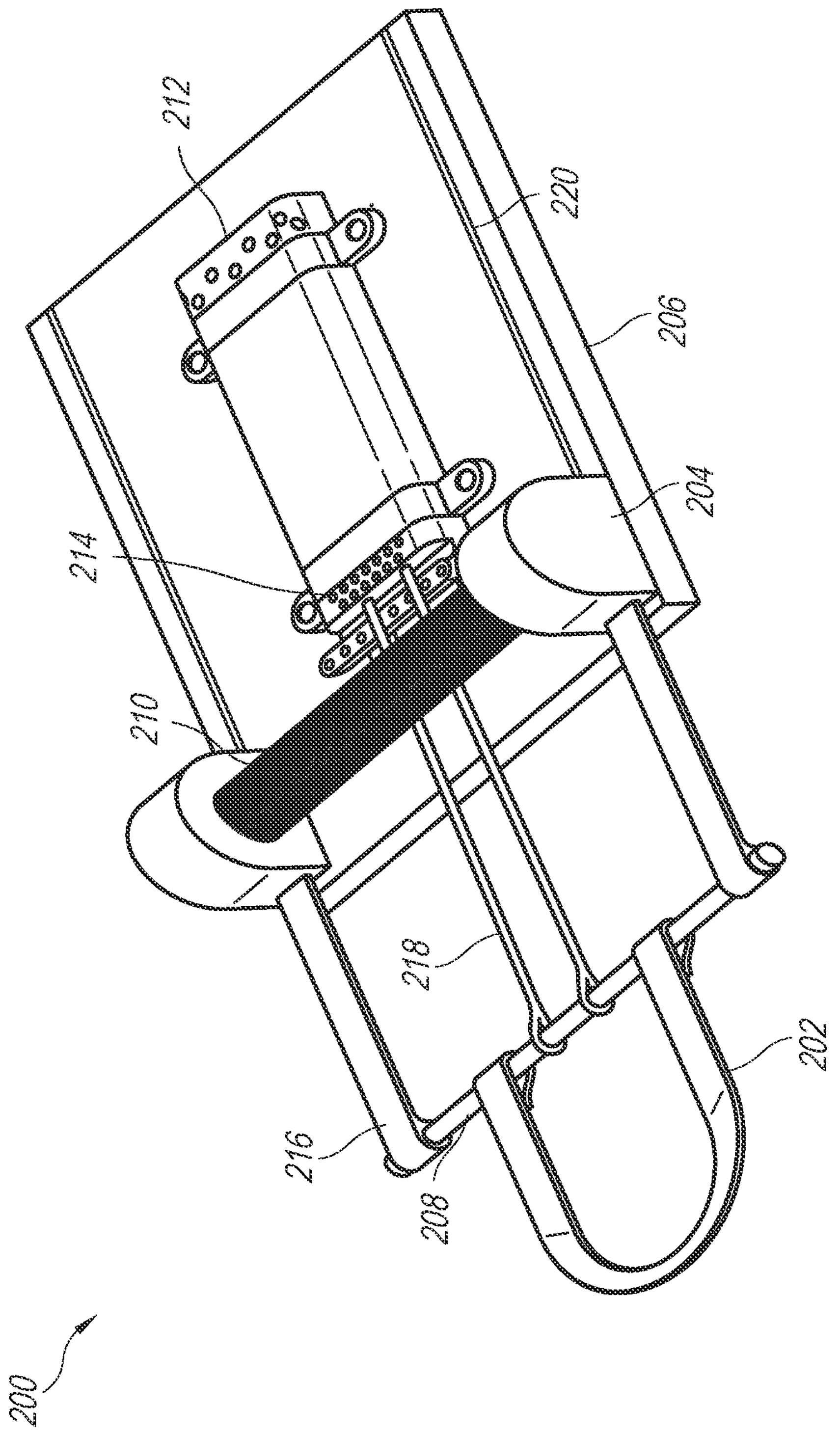
FIG. 2 depicts an embodiment of a paint brush cleaner.

FIG. 2 depicts an embodiment of a paint brush cleaner 200. Paint brush cleaner 200 includes holder 202, spindle mechanism 204, base 206, bar 208, wire brush 210, pump 212, nozzles 214, retractable cords 216, and cables 218. The paint brush cleaner 200 can be similar to paint brush cleaner 110 in FIG. 1. Spindle mechanism 204 can be coupled to the wire brush 210. Retractable cords 216 can be retractable and be coupled to spindle mechanism 204. When the retractable cords 216 are extended or retracted, the spindle mechanism 204 can rotate and cause the wire brush 210 to rotate. The retractable cords 216 can be coupled to bar 208. Holder 202 can be also coupled to the bar 208, so when force is exerted on the holder 202, the bar 208 also exerts force on the retractable cords 216, causing the wire brush 210 to rotate via the spindle mechanism 204. When a paint brush is placed on top of wire brush 210 and exerts a force on the holder 202, the wire brush 210 rotates to clean the paint brush. The spindle mechanism 204 can include a torsion spring that exerts a force to retract retractable cords 216. If the user exerts a force on holder 202 to extend retractable cords 216, then the torsion spring can exert an opposite force to retract retractable cords 216. Thus, the user can quickly and repeatedly clean the paint brush against the wire brush 210 by alternating between exerting and releasing a force on holder 202.

The pump 212 can draw liquid into a chamber within the pump 212, such as water, paint thinner, or other solvents. The liquid can be drawn from inlet valves at an end of pump 212. The pump 212 can include a piston which moves within the chamber. Movement of the piston within the pump 212 can build pressure in the chamber, causing the liquid to be expelled through nozzles 214. In some embodiments, liquid can be drawn into the chamber of pump 212 by the movement of the piston. Cables 218 can be coupled to a piston within pump 212. Cables 218 can also be coupled to bar 208. When force is exerted on holder 202, the bar 208 exerts force on cables 218, moving the piston of pump 212 and causing liquid to spray from the nozzles 214.

The paint brush cleaner 200 can include the wire brush 210 and the pump 212. When cables 218 and retractable cords 216 are both coupled to bar 208, exerting force on the holder 202 can simultaneously pull both retractable cords 216 and cables 218, which respectively rotate the wire brush 210 via the spindle mechanism 204 and activate the pump 212. A user can place a paint brush on top of wire brush 210 and use the paint brush to exert a force on holder 202. This can allow the wire brush 210 to scrub the paint brush while pump 212 applies solvent to the paint brush with a single motion of the paint brush. As described above, this motion can be repeated quickly with the help of torsion springs included in spindle mechanism 204. Simultaneously activating the wire brush and pump can result in more efficient and thorough cleaning of the paint brush compared to scrubbing the paint brush and applying solvent separately.

In some embodiments, the position of the wire brush 210 can be adjustable. For example, the base 206 can include a groove 220 (or notches) that allow the spindle mechanism 204 to be positioned at different sections along the base 206. The position of the wire brush 210 can thus be adjusted by adjusting the position of the spindle mechanism 204 on either side of the wire brush 210. Adjusting the position of the wire brush 210 can allow a user to clean paint brushes of various sizes. For example, a user may want to move the wire brush 210 closer to the nozzles 214 of pump 212 to clean a paint brush with shorter bristles. In another example, the user may want to position the wire brush 210 directly above the nozzles 214 to remove paint residue from the wire brush 210.

In some embodiments, the paint brush cleaner 200 can be modular. For example, the wire brush 210 can be replaceable with brushes made of various materials, such as nylon or polyester. In another example, the spindle mechanism 204 can be replaced with a different mechanism to rotate the wire brush, such as a circular gear, as discussed below and shown in FIG. 6. In another example, the pump 212 can be replaced with a different pump better suited for different solvents. In another example, the pump 212 and/or wire brush 210 can be removable.

Spindle Mechanism

Figure 3:
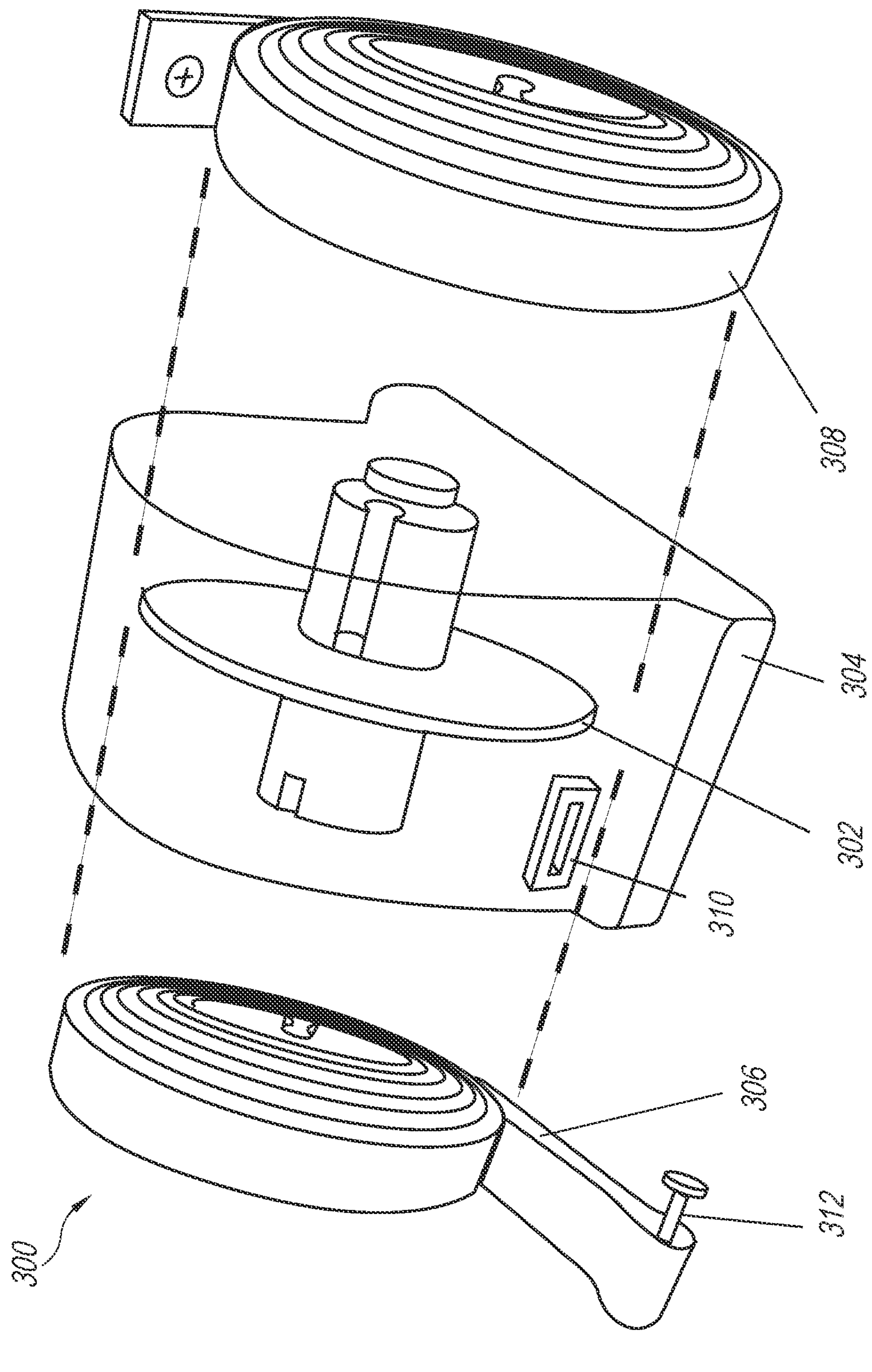
FIG. 3 depicts an exposed view of a spindle mechanism of an embodiment of a paint brush cleaner.

FIG. 3 depicts an exposed view of a spindle mechanism 300 of an embodiment of a paint brush cleaner. The spindle mechanism 300 includes a spindle 302, a spindle housing 304, a retractable cord 306, a torsion spring 308, and an opening 310. The spindle mechanism 300 can be similar to the spindle mechanism 504 in FIG. 5. The spindle 302, retractable cord 306, and torsion spring 308 can be within the spindle housing 304, with one end of the retractable cord 306 emerging through the opening 310. The retractable cord 306 can be coiled, such that when the retractable cord 306 is pulled through the opening 310, the retractable cord 306 uncoils and exerts a torque on the spindle 302, causing spindle 302 to rotate. The rotation of the spindle 302 can be coupled with a wire brush, such as wire brush 210 of FIG. 2, so that rotating the spindle 302 causes the wire brush to rotate. The retractable cord 306 can be pulled, for example, by pulling on a bar 312. This allows a user to pull on the retractable cord 306 or bar 312 to rotate the wire brush.

The torsion spring 308 can be coupled to the spindle 302 to exert a torque on the spindle 302 and cause the spindle 302 to rotate. A torsion spring can exert a torque in an opposite direction of its displacement from an equilibrium angle. Thus, the torsion spring 308 can be configured such that as the retractable cord 306 is pulled through the opening 310, the spindle 302 rotates in a first direction and causes the torsion spring 308 to exert a torque opposite of the first direction. The torque exerted by the torsion spring 308 causes the spindle to rotate opposite of the first direction and retract the retractable cord 306 into the spindle housing 304. A user can thus exert a force on the retractable cord 306 to rotate the spindle 302 then release the force to allow the torsion spring 308 to rotate the spindle back toward equilibrium. This allows a user to quickly and repeatedly rotate the spindle 302. If the spindle 302 is coupled to a wire brush, then this allows the wire brush to quickly rotate and scrub a paint brush.

Note that only one end of bar 312 is shown in FIG. 3. However, a paint brush cleaner can include more than one spindle mechanism 300. For example, a paint brush cleaner can include two spindle mechanisms 300, one on each end of a cylindrical wire brush. In this example, the retractable cords 306 of each spindle mechanism can be coupled to the same bar 312 near respective ends of the bar 312. The components of the spindle mechanism 300 need not be arranged exactly as depicted in FIG. 3. For example, the spindle mechanism 300 can be manufactured with the torsion spring 308 to the left of the spindle 302 and the retractable cord 306 to the right of the spindle 302.

Pump

Figure 4:
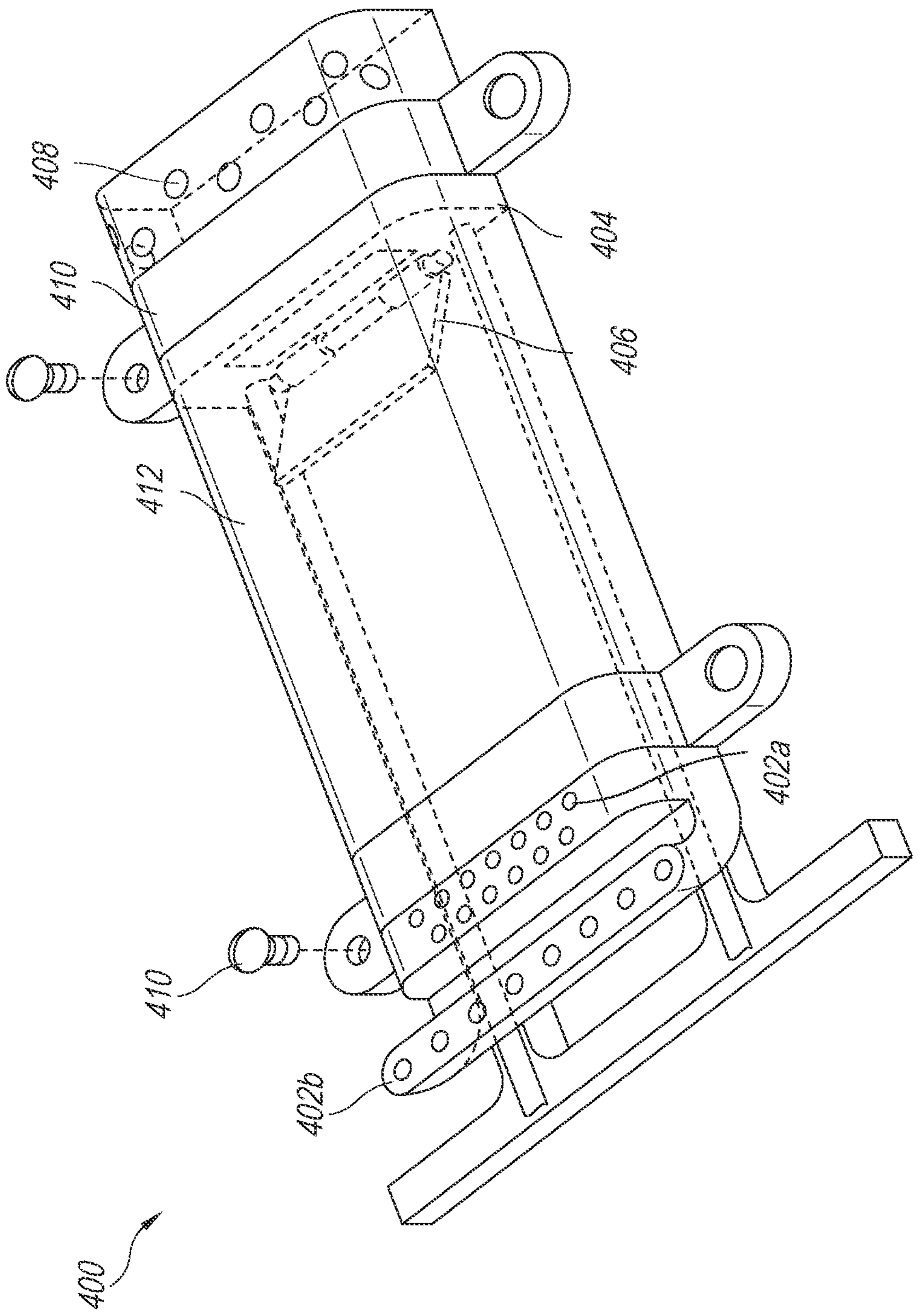
FIG. 4 depicts a pump of an embodiment of a paint brush cleaner.

FIG. 4 depicts a pump 400 of an embodiment of a paint brush cleaner. The pump 400 includes nozzles 402, a piston 404, a one-way valve 406, inlet valves 408, and fasteners 410. In some embodiments, the fasteners 410 attach the pump 400 to a base, such as base 206 in FIG. 2 or base 606 in FIG. 6. In some embodiments, the fasteners can be screws, nails, bolts/nuts, etc. In some embodiments, the pump 400 is attached to a base without fasteners 410, or not attached to a base at all.

The pump 400 includes a lower portion 412 and an upper portion 414, which can be divided by the piston 404. The piston 404 can move back and forth in a first direction toward the nozzles 402*a* and 402*b* and a second direction toward the inlet valves 408, which cause the lower portion 412 and upper portion 414 to change in size accordingly. Liquid can enter the pump through inlet valves 408 and into the upper chamber through one-way valve 406. The liquid can be water, paint thinner, or another solvent to help clean a paint brush. As the piston 404 moves in the first direction, pressure can build in the upper portion 414 as the upper portion 414 decreases in volume. The nozzles 402*a* and 402*b* can be configured to expel the liquid within the upper portion 412 when the pressure is reaches a desired pressure. The nozzles 402*a* and 402*b* can expel the liquid onto a paint brush positioned over the nozzles 402*a* and 402*b*. In some embodiments, the nozzles 402 can be positioned to expel the liquid onto a wire brush and clean the wire brush. The nozzles 402*a* and 402*b* can be configured to expel liquid in a variety of directions depending on the desired coverage.

In some embodiments, as shown in FIG. 4, there can be different sized nozzles 402*a* and 402*b*. A smaller nozzle 402*a* can have a smaller diameter than a larger nozzle 402*b* and expel liquid at higher pressure, while the larger nozzle 402*b* can allow liquid to flow even if debris builds up in the nozzles. In some embodiments, the larger nozzles 402*b* can be positioned separately from the smaller nozzles 402*a*, as shown in FIG. 4. In some embodiments, the nozzles 402*a* and 402*b* can be positioned together. In some embodiments, the nozzles 402*a* and 402*b* can be a uniform size.

The pump 400 can be positioned such that the inlet valves 408 are submerged in liquid, such as in a bucket, pouch, or other reservoir. As the piston moves in the first direction, liquid can be drawn from the reservoir through the inlet valves 408 by suction. A one-way valve 406 can be built into the piston 404. When the piston moves in the second direction, the one-way valve can open to allow liquid to pass from the lower portion 412 to the upper portion 414. The one-way valve 406 can be configured to prevent liquid from flowing from the upper portion 414 to the lower portion 412, so that when the piston moves in the first direction toward the nozzles 402, liquid is forced through the nozzles 402.

Figures 5A, 5B, 5C:
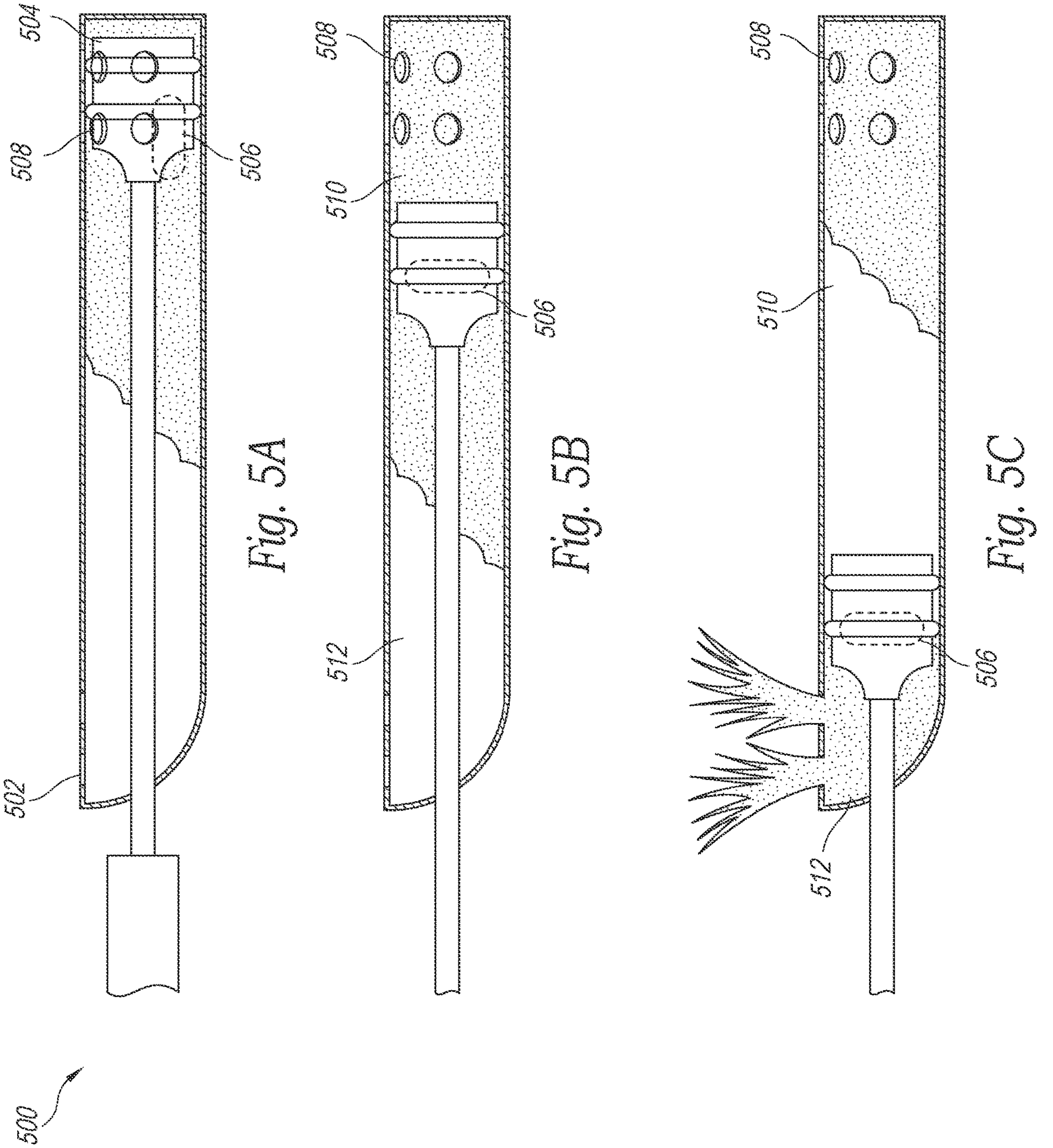
FIG. 5A depicts a pump of an embodiment of a paint brush cleaner in a first position.
FIG. 5B depicts a pump of an embodiment of a paint brush cleaner in a second position.
FIG. 5C depicts a pump of an embodiment of a paint brush cleaner in a third position.

FIG. 5A depicts a pump 500 of an embodiment of a paint brush cleaner in a first position. The pump 500 can be similar to pump 400 depicted in FIG. 4. The pump 500 includes nozzles 502, a piston 504, a one-way valve 506, and inlet valves 508. The pump 500 includes a lower portion 510 and an upper portion 512, divided by the piston 504. The piston 504 can include a seal made of rubber, silicone, or another material that prevents liquid from flowing between the lower portion 510 and the upper portion 512. The piston 504 can move back and forth in a first direction toward the nozzles 502 and a second direction toward the inlet valves 508, which cause the lower portion 510 and upper portion 512 to change in size accordingly. Pump 500 in the first position, as shown in FIG. 5A, has a relatively small lower portion 510 and a larger upper portion 512, with the piston 504 at an end of the pump. FIG. 5A shows the one-way valve 506 in an open position, which allows liquid to flow into the upper portion 512 from lower portion 510.

FIG. 5B depicts a pump 500 of an embodiment of a paint brush cleaner in a second position. Relative to FIG. 5A, the piston 504 has moved toward the nozzles 502, decreasing the volume of the upper portion 512 and increasing the volume of the lower portion 510. The one-way valve 506 is shown in a closed position, which can prevent liquid from flowing from the upper portion 512 to the lower portion 510. As the piston 504 moves from the first position to the second position, suction can draw more liquid into the lower portion 510.

FIG. 5C depicts a pump 500 of an embodiment of a paint brush cleaner in a third position. The piston 504 is now positioned nearer to the nozzles 502. As the volume of the upper portion 512 decreases, the pressure in the upper portion 512 increases, which can cause liquid to be expelled through the nozzles 502, as shown. The liquid can be a solvent that helps clean a paint brush. In addition to the chemical properties of the liquid, the force of the liquid being expelled from nozzles 502 can also help clean the paint brush. After the liquid is expelled, the pump 500 can be returned to the first position, as depicted in FIG. 5A. In some embodiments, the pump 500 is returned to the first position with the help of a torsion spring, for example torsion spring 308 as depicted in FIG. 3.

Gear and Slider

Figure 6:
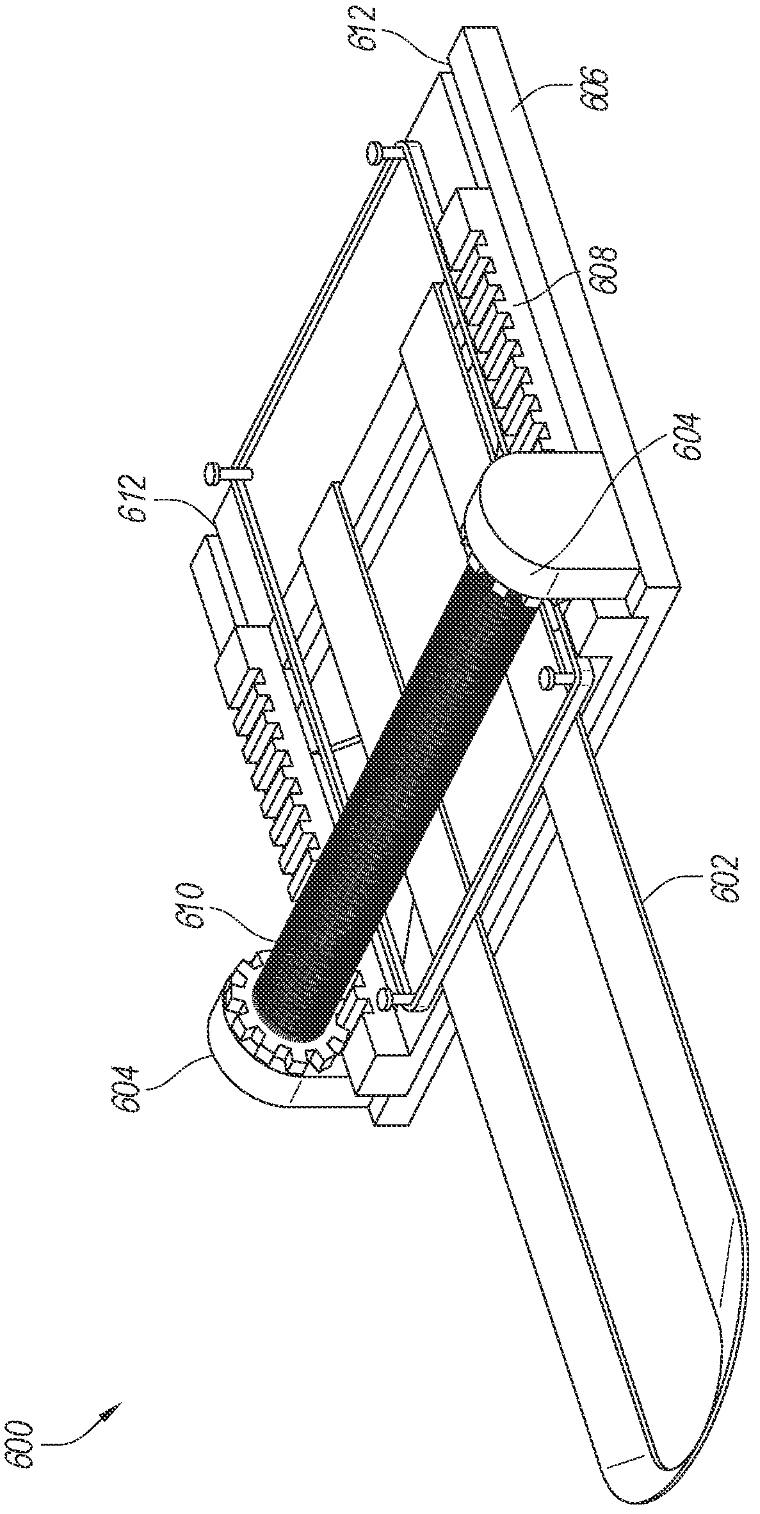
FIG. 6 depicts an embodiment of a sliding element.

FIG. 6 depicts an embodiment of a sliding element 600. Sliding element 600 includes holder 602, gears 604, base 606, slider 608, wire brush 610, and guide tracks 612. Holder 602 can be coupled to the slider 608 such that when force is exerted on the holder 602, the gears 604 are rotated, which causes both the slider 608 and holder 602 move in the direction of the force and along guide tracks 612. Slider 608 can be coupled to the base 606 such that slider 608 can move across the length of the base 606 when force is exerted. When a paint brush is placed on top of wire brush 610 and exerts a force, the wire brush 610 rotates to clean the paint brush.

Sliding element 600 can be a component in a paint brush cleaning system. For example, sliding element 600 can be placed in a housing, such as housing 124 in FIG. 1, pump 212 in FIG. 2, or pump 400 in FIG. 4. The pump can be attached to the top surface of the base 606. In this example, sliding element 600 can be used similarly to paint brush cleaner 110 in FIG. 1. Sliding element 600 can function similarly to paint brush cleaner 200 in FIG. 2. and be used in conjunction with a pump, such as pump 112 in FIG. 1 The gears 604 and slider 608 can rotate the wire brush 610 similarly to a spindle mechanism and retractable cord, such as spindle mechanism 204 and retractable cord 216, as shown in FIG. 2. In some embodiments, the gears 604 and slider 608 can be interchangeable with the spindle mechanism and retractable cord.

In some embodiments, parts of the sliding element 600 are made of corrosion resistant materials such as stainless steel, aluminum, copper, bronze, brass, or galvanize steel. In some embodiments, parts of the sliding element 600 are made of plastic and/or polyester based compounds. For example, the sliding element 600 can be made of a combination of corrosion resistance and other materials. For instance, the gear 604 can be made of stainless steel, the holder 602 can be plastic, and the remaining parts can be polymer-based.

Figure 7:
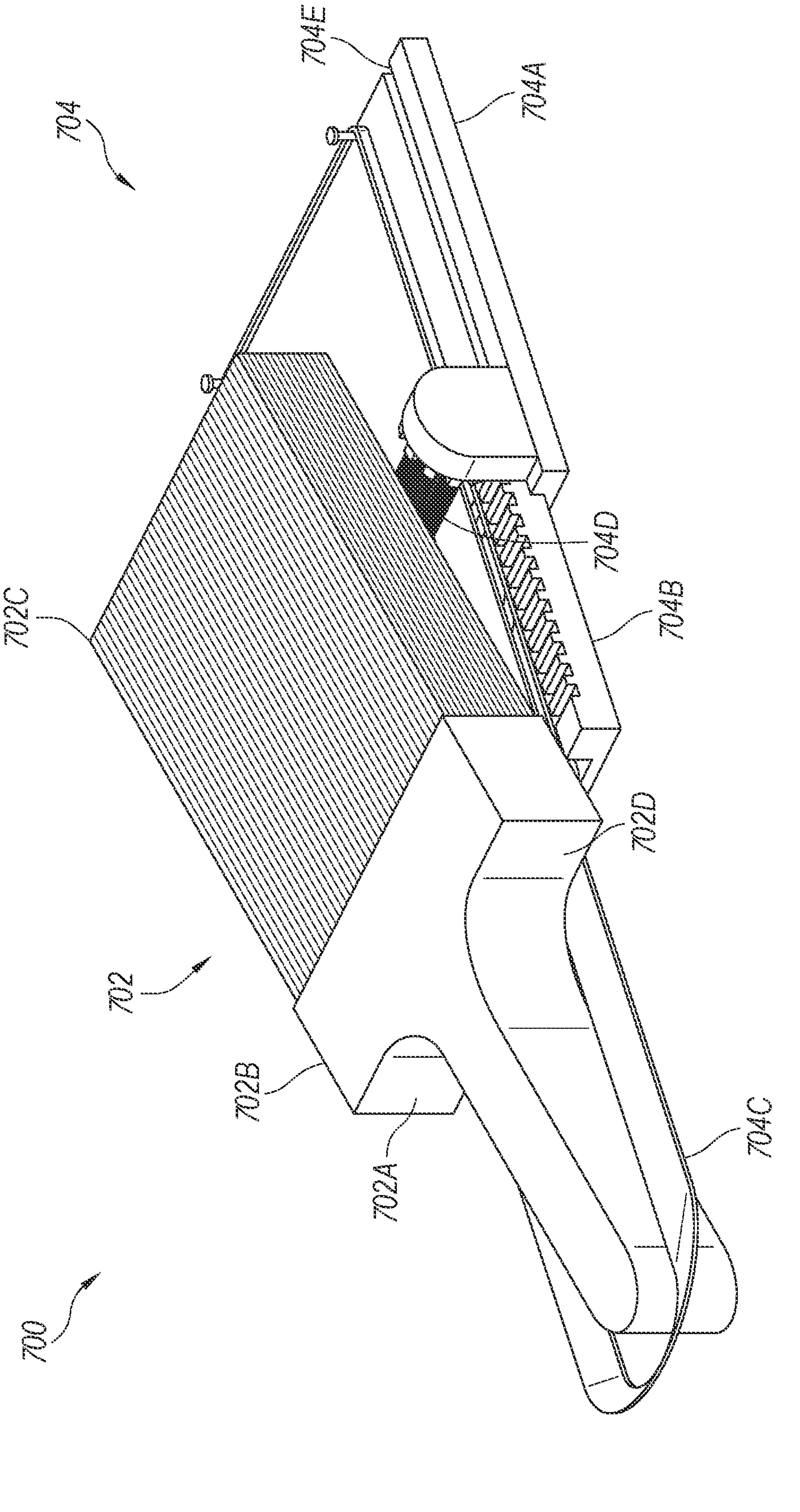
FIG. 7 depicts a paint brush and an embodiment of a sliding element.

In some embodiments, the holder 602 can receive a paint brush such that the bristles of the paint brush are positioned on top of the wire brush 610 and the handle of the paint brush protrudes through the holder 602, as shown in FIG. 7. In some embodiments, the holder 602 is made of flexible and stretchable material such as rubber, or coiled compositions such as a spring. For example, the holder 602 can be made of rubber such that the holder 602 can stretch to receive paint brushes of various size and shapes. The holder 602 can be similar to the holder 116 in FIG. 1 and the holder 202 in FIG. 2.

In some embodiments, the holder 602 can be a single straight piece of flexible material. The material can be bent such that the opposite ends are coupled to the slider 608 to form a U-shaped holder 602. For example, the holder 602 can be a straight piece of rubber. Each end of the rubber piece can be glued to the slider 608 to form a protruding portion (e.g., U-shaped portion). The protruding portion can receive the handle of a paint brush and help the user position the bristles against the wire brush 610.

The gears 604 can be coupled to each side of the wire brush 610. The gears 604 are mounted so that their teeth interlock with the teeth on the slider 608. In some embodiments, sliding element 600 can include only one gear. For example, one side of paint brush cleaner can include a gear and the other side can be a free rotating bearing. In some embodiments, when force is exerted on any of the wire brush 610, the gears 604, the holder 602, and/or the slider 608, the components will move in the direction of the force. In particular, the slider 608 moves along guide tracks 612 within the base 606. For example, if a force is exerted on holder 602 in a direction towards the base 606, the slider 608 will move in that direction and the wire brush 610 and gears 604 will rotate counter-clockwise. In another example, a paint brush can be inserted through the holder 602 such that the bristles rest on the wire brush 610. The handle of the paint brush can protrude through the holder 602. The user can subsequently pull or push the handle to exert force on the holder 602. By exerting force on the holder 602, the wire brush 610 will rotate against the paint brush to clean it.

In some embodiments, the base 606 can include a mechanism on the back side which allows the sliding element 600 to be attached to another object and/or surface. For example, the coupling mechanism can be a hooking mechanism which can hook on to a bucket of solvent. A user can hook the sliding element 600 to the bucket and submerge a paint brush into the solvent while also rubbing the paint brush against wire brush 610. In another example, the base 606 can include suction cups. A user can affix the sliding element 600 to a surface near a working area using the suction cups. In some embodiments, the sliding element 600 can be affixed to a housing, such as housing 124 in FIG. 1.

FIG. 7 depicts a side view 700 of a paint brush and an embodiment of a sliding element. Side view 700 includes paint brush 702 and sliding element 704. Paint brush 702 includes handle 702A, ferrule 702B, bristles 702C, and top of ferrule 702D. The handle 702A is connected to the ferrule 702B, which grips the bristles 702C. Sliding element 704 includes base 704A, toothed slider 704B, holder 704C, wire brush 704D, and guide track 704E. Sliding element 704 has similar functionality to sliding element 600 described in conjunction with FIG. 6. For example, sliding element 704 can be included in a paint brush cleaning system similar to paint brush cleaning system 100 of FIG. 1. Sliding element 704 can be attached to a housing, such as housing 124 of FIG. 1. Sliding element 704 can include a pump attached to the top surface of the base 704A, such as pump 112 of FIG. 1, pump 212 of FIG. 2, or pump 400 of FIG. 4.

In some embodiments, the handle 702A of the paint brush can be used to actuate the wire brush 704D via the holder 704C, toothed slider 704B and gears 604, such that bristles 702C are cleaned. More specifically, in some embodiments, a user can insert handle 702A through holder 704C such that top of ferrule 702D is pressed against the holder 704C. The user can then hold both the handle 702A and holder 704C to actuate the wire brush 704D. In some embodiments, a user can place the paint brush 702 such that an end of the handle 702A is pressed against the end of the holder 704C and the bristles 702C are resting on top of wire brush 704D (e.g., as depicted in FIG. 7).

In some embodiments, the wire brush 704D can rotate until the toothed slider 704B has moved with guide track 704E and across the length of the base 704A. For example, the base 704A can be five inches long and allow the toothed slider 704B to travel four inches. Further, the wire brush 704D can have a circumference of two inches. Thus, the wire brush 704D can make two rotations before the toothed slider 704B has covered the maximum travel distance. In other words, the wire brush 704D can clean four inches of the bristles 702C before the toothed slider 704B has to slide in the opposite direction.

In some embodiments, the starting position of the paint brush 702 can depend on the length of the bristles 702C in relation to the length that toothed slider 704B can slide. For example, the bristles 702C can be ten inches long, while the toothed slider 704B can slide five inches. Thus, a user can recognize the entire length of the bristles 702C cannot be cleaned while the paint brush 702 is in the same position. A user can first place the paint brush 702 such that the end of handle 702A is pressed against the end of holder 704C. In this position, a first half (e.g., the half closest from ferrule 702B) can be cleaned. In the next iteration, the user can push handle 704*a* further away from sliding element 704 such that the portion where the handle 702A and ferrule 702B meet is pressed against the end of holder 704C. In this position, the half further from the ferrule 702B can be cleaned by wire brush 704D.

In some embodiments, the sliding element 704 can be modular such that each component can be replaced or exchanged with a different component. For example, to accommodate for a larger paint brush 702, a user can exchange base 704A and toothed slider 704B for longer versions. In another example, the bristles 702C can be too soft for a wire brush, and thus, user can replace wire brush 704D with a softer brush. In yet another example, the user can replace the holder 704C with a different holder that is configured to accommodate a longer handle 702A.

Figure 8A:
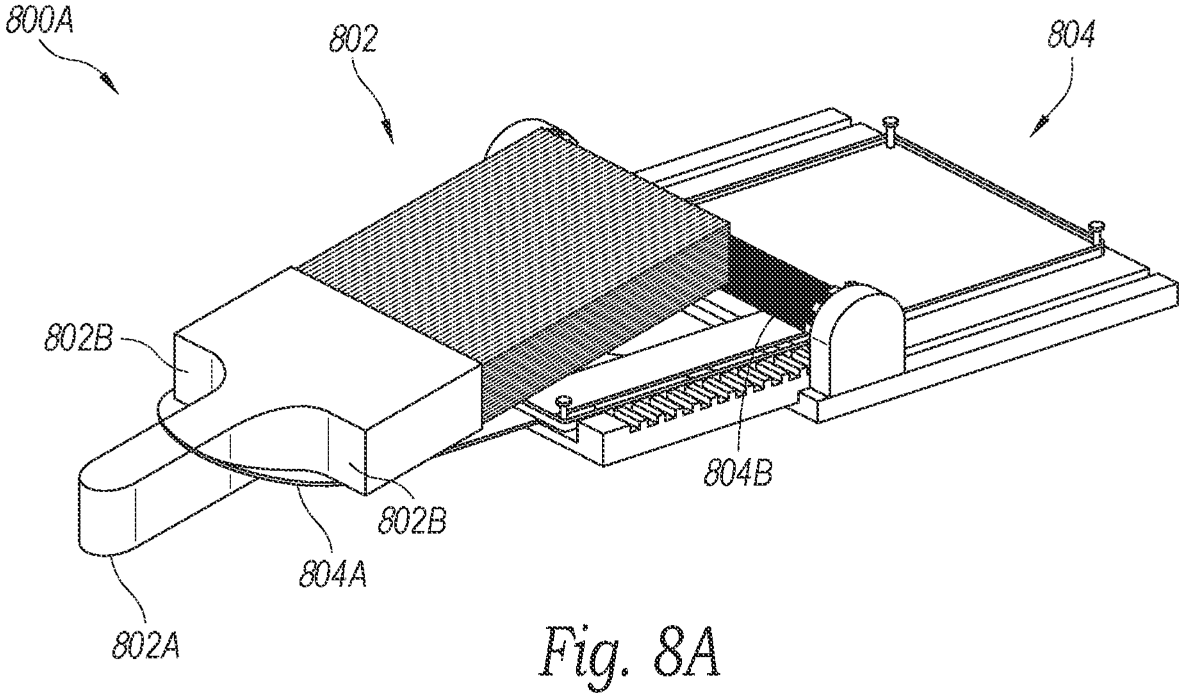
FIG. 8A depicts a paint brush handle inserted through a holder of an embodiment of a sliding element.

FIG. 8A depicts a paint brush handle inserted through a holder of an embodiment of a sliding element in a first position. First position 800A includes paint brush 802 and sliding element 804. The paint brush 802 includes handle 802A and top of ferrule 802B. As mentioned above, the top of ferrule 802B can be pressed against the holder 804A such that that the handle 802A protrudes from the other side of holder 804A. In some embodiments, a user can first insert the handle 802A through holder 804A. The user can then use handle 802A to move the paint brush 802 back and forth against the wire brush 804B. In some embodiments, the user can grip both the handle 802A and the holder 804A. By doing so, the user can move the paint brush 802 in sync with the rotation of the wire brush 804B. In some embodiments, the user can move the paint brush 802 against the top of the wire brush 804B, as depicted in FIG. 8A. In some embodiments, the user can move the paint brush 802 against the bottom of the wire brush 804B.

Figure 8B:
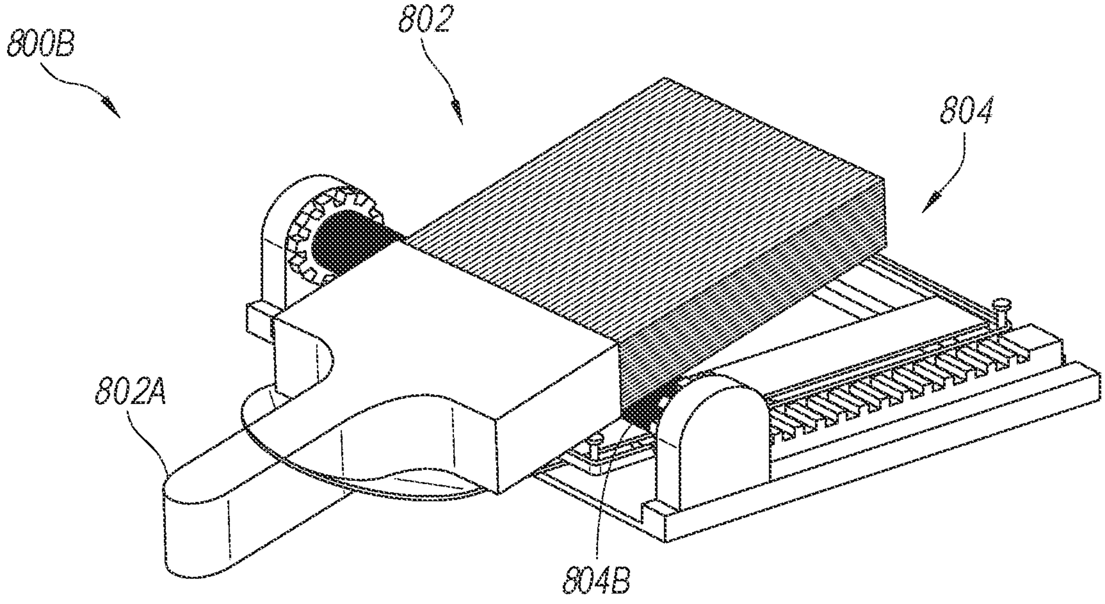
FIG. 8B depicts a paint brush resting on a wire brush of an embodiment of a sliding element.

FIG. 8B depicts a paint brush handle inserted through a holder of an embodiment of a sliding element in a second position. Second position 800B includes paint brush 802 and sliding element 804. A user can clean the paint brush 802 by gripping handle 802A and moving the paint brush 802 against wire brush 804B. For example, if the sliding element 804 is horizontal (e.g., resting on top of a desk), the user can move the paint brush 802 back and forth against the wire brush 804B. In this case, the force exerted by the user can be in the same direction as the movement of the paint brush 802. Although the user can choose to exert a downward force to press the paint brush 802 against the wire brush 804B, it is not required. Alternatively, if the sliding element 804 is vertical (e.g., hanging from the side of a water bucket), the force exerted by the user can be both in the direction of the movement of the paint brush 802 and in a direction towards the wire brush 804B. By exerting force in the direction of the wire brush 804B, the user ensures that the paint brush 802 is making sufficient contact with the wire brush 804B to clean the paint brush 802.

The sliding element 804 can be affixed to a housing, such as housing 124 in FIG. 1. The housing can be attached to a user's belt, so the user can position the paint brush 802 at his or her waist or hip, with the handle 802A inserted through the holder 804A. The user can then clean the paint brush using the motion described above. Affixing the sliding element 804 to a housing worn at waist level provides the user with a convenient and portable way to clean the paint brush 802. The sliding element 804 can further be coupled to a pump, such as pump 112 in FIG. 1 or pump 400 in FIG. 4. The pump can be actuated and eject solvent in concert with the movement of the sliding element 804, allowing the user to more thoroughly clean the paint brush.

EXAMPLES

1. A paint brush cleaning system comprising: a housing configured to contain a cleaning agent; a paint brush cleaner coupled to the housing, the paint brush cleaner including: a cleaning brush rotatably coupled to the housing and operable to rotate upon application of a force; a pump coupled to the housing and configured to generate a flow of the cleaning agent in response to the application of the force; and a retractable cord configured to cause rotation of the cleaning brush in response to the application of the force on the retractable cord.

2. The paint brush cleaning system of example 1, wherein the retractable cord is further configured to cause actuation of the pump in response to the application of the force on the retractable cord.

3. The paint brush cleaning system of example 1, further comprising: a holder coupled to the retractable cord, wherein the holder is configured to: receive a handle of a paint brush; and upon the application of the force: cause the cleaning brush to rotate; and actuate the pump.

4. The paint brush cleaning system of example 3, wherein the holder is made of a flexible material.

5. The paint brush cleaning system of example 1, wherein the cleaning brush is a cylindrical wire brush.

6. The paint brush cleaning system of example 1, further comprising: a cable coupled to the pump; and a bar coupled to the cable and the retractable cord, the bar configured to: cause the cable and the retractable cord to move so as to cause the pump to actuate and the cylindrical brush to rotate upon the application of the force to the bar.

7. The paint brush cleaning system of example 6, further comprising: a holder coupled to the bar, the holder configured to: receive a handle of a paint brush; cause the cleaning brush to rotate; and upon the application of the force to the holder, actuate the pump.

8. The paint brush cleaning system of example 1, further comprising: an attachment configured to attach the housing to a user's belt.

9. The paint brush cleaning system of example 1, further comprising: a spindle housing; a spindle, within the spindle housing, coupled to the cleaning brush; and a torsion spring, within the spindle housing, wherein the retractable cord extends from an opening of the spindle housing, and wherein the torsion spring is configured to cause the retractable cord to retract into the opening when the torsion spring is displaced from an equilibrium.

10. The paint brush cleaning system of example 1, wherein the pump comprises: a piston; an inlet valve at a first end of the pump configured to allow the cleaning agent to flow from the housing into the pump; a plurality of nozzles at a second end of the pump configured to eject the cleaning agent from within the pump when the piston moves towards the second end; and a one-way valve built into the piston and configured to open when the piston moves towards the first end.

11. The paint brush cleaning system of example 10, wherein the plurality of nozzles comprises: a first set of nozzles with a first diameter; and a second set of nozzles with a second diameter less than the first diameter.

12. A paint brush cleaner comprising: a base having a top surface; a first gear coupled to the top surface; a wire brush coupled to the first rotating element; and a slider movably coupled to the first rotating element, the slider being operable to actuate the gear to cause rotation of the brush when the slider is moved in translation along the top surface of the base.

13. The paint brush cleaner of example 12, further comprising: a housing configured to house a cleaning agent, wherein the base is coupled to the housing, wherein the top surface has a first side and a second side opposite the first side, and wherein the first gear coupled to the first side of the top surface; a second gear coupled to the second side of the top surface, wherein the wire brush interconnects the first gear and the second gear; and a holder coupled to the first and second gears and configured to receive a handle of a paint brush, wherein the first and second gears cause the wire brush to rotate when a force is applied to the holder.

14. The paint brush cleaner of example 13, wherein the force is applied to the paint brush.

15. The paint brush cleaner of example 13, further comprising: a slider movably coupled to the first and second gears, the slider being configured to actuate the first and second gears to cause rotation of the wire brush when the slider is moved in translation along the surface of the base.

16. The paint brush cleaner of example 15, wherein the slider includes a first linear gear and a second linear gear, and wherein the first gear is a first circular gear configured to rotate when the first linear gear is moved in translation along the surface, and the second gear is a second circular gear configured to rotate when the second linear gear is moved in translation along the top surface.

17. The paint brush cleaner of example 12, further comprising: a pump configured to eject liquid when the force is applied to the holder.

18. A paint brush cleaning system comprising: a housing configured to contain a cleaning agent; a base coupled to the housing and including a top surface; a spindle housing coupled to the top surface, the spindle housing comprising: a spindle, a retractable cord coupled to the spindle and configured to cause the spindle to rotate as the retractable cord is retracted or extended from an opening in the housing, and a torsion spring configured to exert a first force that retracts the retractable cord into the housing when the retractable cord is extended from the opening in the housing; a wire brush coupled to the spindle; a pump coupled to the top surface of the base including: a piston, a one-way valve built into the piston, an inlet valve configured to draw the cleaning agent into the pump, and a nozzle configured to eject the cleaning agent from the pump when the pump is actuated; and a holder coupled to the piston of the pump and the retractable cord, the holder configured receive a handle of a paint brush and to cause the wire brush to rotate in response to a second force exerted on the holder.

19. The paint brush cleaning system of example 17, wherein the reservoir includes an attachment configured to attach to clothing of a user.

20. The paint brush cleaning system of example 17, wherein the holder is further configured to actuate the pump in response to the second force exerted on the holder.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A paint brush cleaner comprising:

a base having a top surface and a bottom surface on which an attachment mechanism is mounted, the attachment mechanism allowing the bottom surface of the base to be secured to another object;

a slider that includes first teeth, is directly coupled to the top surface of the base, and that is able to move along at least part of a length of the top surface of the base;

a first gear that includes second teeth that interlock with the first teeth of the slider;

a first brush that is coupled to the first gear in such a manner that the first brush is suspended above the top surface of the base with a gap therebetween, wherein when a force is exerted on the slider parallel to the length of the top surface of the base, the slider moves, thereby actuating the first gear and causing rotation of the first brush;

a holder coupled to the slider and configured to receive a handle of a paint brush, wherein the slider is caused to move along at least part of a length of the top surface of the base so as to cause the first gear to rotate when a force is applied to the holder.

2. The paint brush cleaner of claim 1, further comprising:

a housing configured to house a cleaning agent, wherein the base is coupled to the housing.

3. The paint brush cleaner of claim 2, further comprising:

a pump configured to eject liquid when the slider is moved in translation along the top surface.

4. The paint brush cleaner of claim 1, wherein the holder is arranged to enable the force to be applied to the holder by the handle of the paint brush.

5. The paint brush cleaner of claim 1, further comprising:

a second gear rotatably coupled to the slider.

6. The paint brush cleaner of claim 5, wherein first gear and the second gear are coupled to the first brush at opposite ends of the first brush.

7. The paint brush cleaner of claim 1, wherein the first brush is a wire brush.

8. A paint brush cleaner comprising:

a base having a top surface and a bottom surface on which an attachment mechanism is mounted, the attachment mechanism allowing the bottom surface of the base to be secured to another object;

a slider that includes first teeth, is directly coupled to the top surface of the base, and that is able to move along at least part of a length of the top surface of the base;

a gear that includes second teeth that interlock with the first teeth of the slider;

a wire brush that is coupled to the gear in such a manner that the wire brush is suspended above the top surface of the base with a gap therebetween; and a holder that is coupled to the slider and configured to receive a handle of a paint brush, wherein when a force is exerted on the holder by the handle of the paint brush, the slider moves, thereby actuating the gear and causing rotation of the wire brush.

* * * * *